United States Patent
Reed et al.

(10) Patent No.: US 7,035,874 B1
(45) Date of Patent: Apr. 25, 2006

(54) MEDIA STREAMING IN A DATABASE

(75) Inventors: Michael L. Reed, San Diego, CA (US); John D. Frazier, Ramona, CA (US); Kevin K. Gold, San Diego, CA (US)

(73) Assignee: NCR Corp., Dayton, OH (US)

( * ) Notice: Subject to any disclaimer, the term of this patent is extended or adjusted under 35 U.S.C. 154(b) by 402 days.

(21) Appl. No.: 10/112,335

(22) Filed: Mar. 29, 2002

(51) Int. Cl.
*G06F 17/30* (2006.01)

(52) U.S. Cl. ..................................... 707/104.1; 707/10

(58) Field of Classification Search .............. 707/1–10, 707/100–104.1; 709/203, 217, 218, 227
See application file for complete search history.

(56) References Cited

U.S. PATENT DOCUMENTS

| | | | | |
|---|---|---|---|---|
| 6,212,562 B1 * | 4/2001 | Huang | ......................... | 709/227 |
| 6,529,950 B1 * | 3/2003 | Lumelsky et al. | .......... | 709/218 |
| 6,711,607 B1 * | 3/2004 | Goyal | ........................ | 709/203 |
| 6,751,653 B1 * | 6/2004 | Austin | ........................ | 709/217 |
| 6,757,710 B1 * | 6/2004 | Reed | ........................... | 709/203 |
| 6,782,394 B1 * | 8/2004 | Landeck et al. | ......... | 707/104.1 |

\* cited by examiner

*Primary Examiner*—Jeffrey Gaffin
*Assistant Examiner*—Yicun Wu
(74) *Attorney, Agent, or Firm*—Frommer, Lawrence & Haug LLP; Steve Stevens

(57) ABSTRACT

Methods and apparatus for streaming data from a database system to a client system. In one implementation, a database management system includes: one or more data storage facilities for use in storing data composing records in tables of a database, where the data includes media data stored in one or more media objects; one or more processing modules configured to manage the data stored in the data-storage facilities; one or more quality of service modules configured to manage streaming media data from the data-storage facilities; and a database management component configured to receive stream requests and database queries for data stored in the data-storage facilities, including passing a stream request indicating media data to the processing module that corresponds to the data-storage facility storing the media data indicated by the stream request.

8 Claims, 7 Drawing Sheets

MEDIA STREAMING IN A DATABASE

RELATED APPLICATIONS

This application is related to the co-pending and commonly assigned patent application "POLYMORPHIC DATABASE FIELD," application Ser. No. 10/112,242 (filed on Mar. 29, 2002), the disclosure of which is incorporated herein by reference.

BACKGROUND

In a typical database system supporting SQL (Structured Query Language), table rows can include one or more fields that are user defined type (UDT) fields. One type of UDT is a UDT structured type. The UDT structured type shares many properties in common with the C-language "struct." Both a C-language struct and a UDT structured type cam be declared to be composed of any number of data members which can be either homogeneous or heterogeneous with respect to their data types. Both a C-language struct and a UDT structured type can also be nested, containing data members which are themselves structured types. The declaration of a UDT structured type is entered into the DBS system using SQL Data Definition Directives.

Media data, such as audio and video data, is typically stored in an object relational database management system (ORDBMS) using a large object format, such as a BLOB (binary large object). A BLOB does not typically itself provide a mechanism for retrieving and displaying its media data. As a result, the BLOB's data is typically copied to local disk space and then the data is played through a media player. Both time and storage space are used to support this copying.

SUMMARY

The present disclosure provides methods and apparatus for streaming data from a database system to a client system. In one implementation, a database management system includes: one or more data storage facilities for use in storing data composing records in tables of a database, where the data includes media data stored in one or more media objects; one or more processing modules configured to manage the data stored in the data-storage facilities; one or more quality of service modules configured to manage streaming media data from the data-storage facilities; and a database management component configured to receive stream requests and database queries for data stored in the data-storage facilities, including passing a stream request indicating media data to the processing module that corresponds to the data-storage facility storing the media data indicated by the stream request.

In another implementation, a method of streaming data from a database system to a client system includes: receiving a stream request at a database system from a streaming server to stream a selection of media data, where at least part of the media data is stored in a media object; establishing a media connection between the database system and a client system; streaming the media data in the media object across the media connection to the client system using a quality of service module in the database system, where the quality of service module uses one or more dedicated quality of service module tasks to stream data.

DETAILED DESCRIPTION

Figure 1:
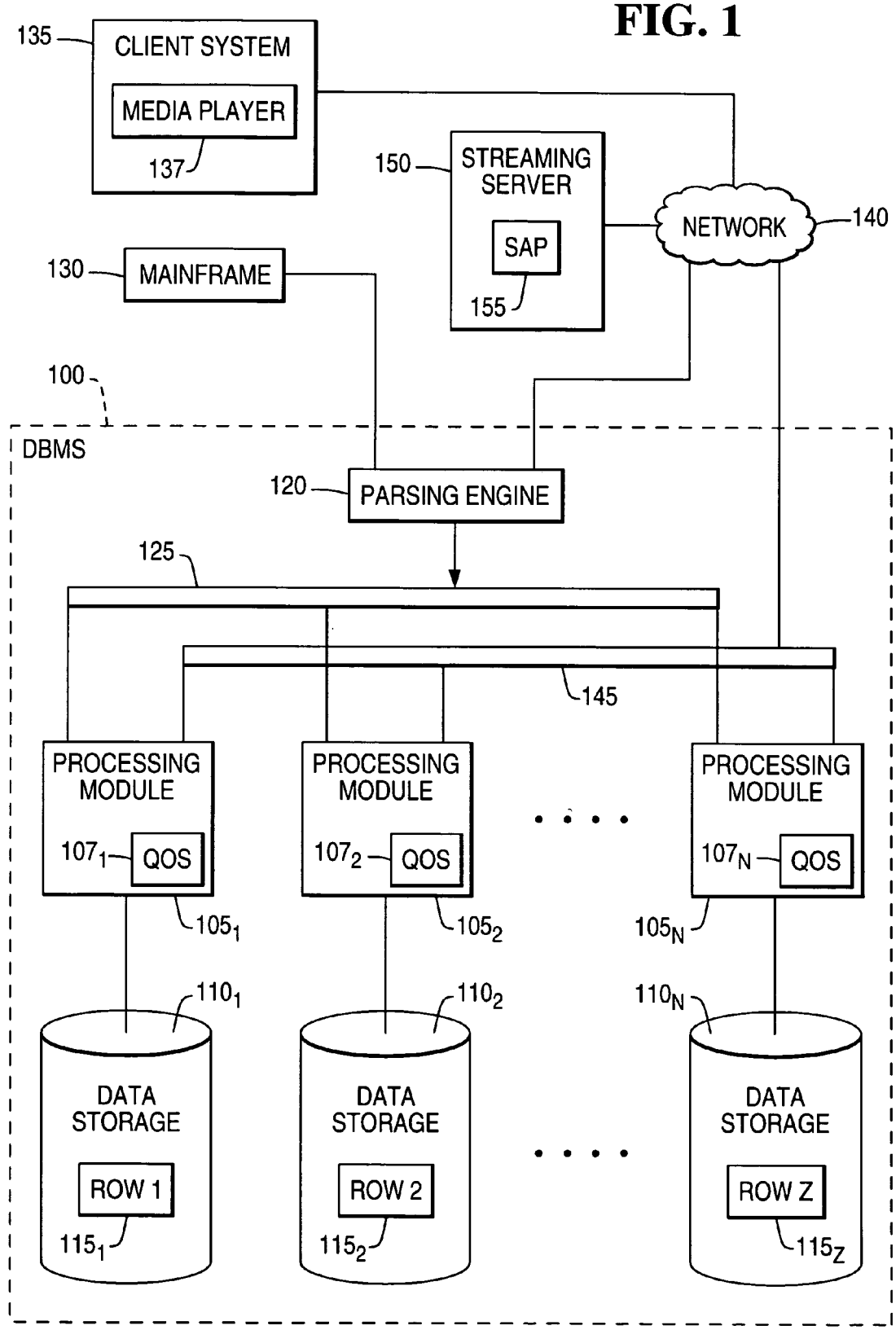
FIG. 1 shows a sample architecture of a database management system (DBMS).

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_{1 \ldots N}$ that manage the storage and retrieval of data in corresponding data-storage facilities $101_{1 \ldots N}$. Each of processing modules $105_{1 \ldots N}$ manages a portion of a database that is stored in a corresponding one of data storage facilities $101_{1 \ldots N}$. A processing module 105 runs one or more processing module worker tasks. Each of data storage facilities $101_{1 \ldots N}$ includes one or more storage devices, such as disk drives.

Each of processing modules $105_{1 \ldots N}$ includes a respective QOS ("quality of service") module $107_{1 \ldots N}$. Each of QOS modules $107_{1 \ldots N}$ streams data to a client upon request, as described below. A QOS module 107 runs one or more dedicated QOS module tasks that are treated as "trusted" tasks within DBMS 100 and so receive a higher level of priority and data access to ensure a desired level of quality of service. In alternative implementations, QOS modules $107_{1 \ldots N}$ are distributed differently than shown in FIG. 1, such as having QOS modules $107_{1 \ldots N}$ external to processing modules $105_{1 \ldots N}$, having multiple QOS modules $107_{1 \ldots X}$ with each of processing modules $105_{1 \ldots N}$, or having multiple processing modules $105_{1 \ldots N}$ share a QOS module 107. In another alternative implementation, DBMS 100 includes a gateway node to manage communication with QOS modules $107_{1 \ldots N}$.

Because each of processing modules $105_{1 \ldots N}$ includes a respective QOS module $107_{1 \ldots N}$, DBMS 100 can handle multiple streaming sessions in parallel. Furthermore, each QOS module 107 can manage multiple streaming sessions as well. The parallelism is limited by bandwidth and a desired level of quality of service. For resources shared by QOS modules $107_{1 \ldots N}$ (e.g., memory or network connection bandwidth), each QOS module 107 is allocated a portion of the resource. As more data is moved and bandwidth limitations are approached, quality of service can degrade. If an additional session will degrade quality of service below a desired threshold, the additional session will be denied or deferred. Alternatively, DBMS 100 issues a warning and requests confirmation before proceeding with a request that may degrade quality of service.

DBMS 100 stores and retrieves data for records or rows in tables of the database stored in data storage facilities $110_{1 \ldots N}$. Rows $115_{1 \ldots Z}$ of tables are stored across multiple data storage facilities $110_{1...N}$ to ensure that system workload is distributed evenly across processing modules $105_{1...N}$. A parsing engine 120 organizes the storage of data and the distribution of rows $105_{1...Z}$ among processing modules $105_{1...N}$ and data storage facilities $110_{1...N}$. In one implementation, parsing engine 120 forms a database management component for DBMS 100. Parsing engine 120 and processing modules $105_{1...N}$ are each connected to a database bus 125. Parsing engine 120 and processing modules $105_{1...N}$ use database bus 125 to send and receive data and messages throughout DBMS 100.

Parsing engine 120 also coordinates the accessing and retrieval of data from data storage facilities $101_{1...N}$ with processing modules $105_{1...N}$ in response to queries received from a user at a connected mainframe 130 or from a client computer system 135 across a network 140, such as the Internet. Multiple client systems 135 can be connected to network 140, each submitting requests and receiving data in parallel to and from DBMS 100. Processing modules $105_{1...N}$ are each connected to a network bus 145. Network bus 145 is also connected to network 140. QOS modules $107_{1...N}$ stream data through network bus 145 to a user at client system 135, as described below. In an alternative implementation, DBMS 100 includes two database systems: one for media streaming based around network bus 145 and QOS modules $107_{1...N}$, and one for other database requests based around parsing engine 120 and database bus 125.

Client system 135 includes a media player application 137, such as a plug-in to a web browser. A user at client system 135 selects media data to play through media player 137 and media player 137 generates a request to play the media data. Client system 135 sends the play request to a streaming server 150 connected to network 140. Streaming server 150 includes a Streaming Application Plug-in (SAP) 155. Streaming server 150 passes the play requests to SAP 155. SAP 155 translates the play requests to SQL database requests to cause DBMS 100 to retrieve the requested media data and stream the media data to client system 135. In an alternative implementation, client system 135 includes SAP 155 and streaming server 150 acts as a gateway to DBMS 100 for stream requests.

DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation SQL provides various defined types of data and methods for accessing and manipulating data. SQL also supports user defined types (UDT) and user defined methods (UDM). In one implementation, DBMS 100 supports SQL and includes support for UDT's and UDM's.

DBMS 100 supports a UDT called MediaUDT. MediaUDT is based on a BLOB data type. A MediaUDT object stores media data in a media data member. The media data member stores the media data itself and media type data. The media data can be in any media format (e.g., mov, avi, wav, mpg). Accordingly, the MediaUDT type is a polymorphic storage type. Polymorphic database fields are also described in "POLMORPHIC DATABASE FIELD", application Ser. No. 10/112,242, filed Mar. 29, 2002, the disclosure of which is incorporated herein by reference. The media type data identifies the type or format of the media data, such as by using a MIME description. In an alternative implementation, the media type data is stored in a separate data member of the MediaUDT object MediaUDT also extends the BLOB type by including UDM's. One MediaUDT UDM is MediaFormat( ). A call to MediaFormat( ) causes the MediaUDT object to return the type of the media data stored in the object. Another MediaUDT UDM is Play( ). A call to Play( ) causes a processing module 105 to initiate streaming of the media data of the MediaUDT object through a QOS module 107, as described below. The Play( ) UDM can be implemented to accept one or more parameters, such as playing time, fidelity, volume, etc. In alternative implementations, the MediaUDT type includes one or more additional UDM's, such as methods for setting or adjusting: the playing time (e.g., PlayingTime( )), the frame rate, color, contrast, black and white, language, displayed text (e.g., closed captioning or sign language), content control (e.g., filtering based on ratings such as G, PG, etc.; showing alternate endings), resolution, clipping windows, display format (e.g., letterbox), advertisements (e.g., which advertisements to display; number or frequency of advertisements, positioning including overlays, scaling of content to make room for advertisements, transparency).

DBMS 100 stores a MediaUDT object to represent a MediaUDT field. A single MediaUDT field can be used for the media data. A separate column for the type of the media data is not used because the MediaUDT object can self-identify the type of its media data using the MediaFormat( ) UDM.

SAP 155 is a plug-in SQL application used by streaming server 150. In alternative implementations, SAP 155 is a DLL (dynamic link library), an independent application, or an embedded module of streaming server 150. SAP 155 supports industry standard data access interfaces (e.g., those supported by the Real Server™). SAP 155 uses objects and methods to generate SQL requests and handle responses in interacting with DBMS 100. SAP 155 generates the SQL requests using SQL embedded within the code of SAP 155. SAP 155 inserts or replaces tokens in the embedded SQL according to parameters received or generated by SAP 155. SAP 155 supports two object types: System and MediaObj.

SAP 155 uses a System object to set up a streaming session. A System object has two methods: Initialize( ) and CreateObjectRef( ). System->Initialize( ) initializes an SQL connection between streaming server 150 and DBMS 100 and defines a cursor. The cursor locks a selected portion of a table in DBMS 100 including the indicated media object (e.g., locking one or more rows). The following SQL statements for defining a cursor are generated using the embedded SQL of SAP 155 by a call to one implementation of System->Initialize( ):

DECLARE ObjectCursor CURSOR FOR
   SELECT MediaObject WHERE (NAME=:SEARCH-NAME);
OPEN ObjectCursor;

The DECLARE statement defines the cursor for a media object matching SEARCHNAME. The OPEN statement opens the cursor, locking the media data in the table in DBMS 100.

System->CreateObectRef( ) requests a reference to the indicated media object and stores the reference in a MediaObj object. As described below, DBMS 100 takes several actions in response to this request to prepare for streaming. The following SQL statement is generated by a call to one implementation of System->CreateObectRef( ):

FETCH ObjectCursor INTO :MediaObject; The FETCH statement requests a reference to the media data locked by the cursor and stores the reference in a MediaObj object.

SAP 155 uses a MediaObj object to establish a connection to the media data and manage the streaming. A MediaObj object has four methods: DoesExist( ), MimeType( ), Initialize( ), and Close( ). MediaObj->DoesExist( ) checks the existence of the media object in DBMS 100 referenced by the MediaObj object. The following SQL statement is generated by a call to one implementation of MediaObj->DoesExist ( ):

RETURN sqlca.sqlcode;

MediaObj->MimeType( ) requests the media type of the indicated media object and using the reference in the MediaObj object. As described below, DBMS 100 takes several actions in response to this request to prepare for streaming. DBMS 100 returns the media type and also returns connection information for establishing a media connection between client system 135 and a QOS module 107 in DBMS 100. The following SQL statement is generated by a call to one implementation of MediaObj->MimeType ( ):

SELECT MediaObject.MediaFormat( )
        WHERE (NAME=:SEARCHNAME);
    RETURN MediaObject.MediaFormat( )

The SELECT statement requests the media type of the media data referenced in the MediaObj object. SEARCHNAME is a program variable of SAP 155 containing text related to the received request. The RETURN statement returns the media type. In an alternative implementation where the media type is not stored as a MIME description, SAP 155 uses a different method to access the media type (e.g., requesting the media type from a separate data member of the media object in DBMS 100).

MediaObj->Initialize( ) requests DBMS 100 to begin streaming the media data of the indicated media object and using the reference in the MediaObj object. As described below, DBMS 100 takes several actions in response to this request to stream the media data. The following SQL statement is generated by a call to one implementation of MediaObj->Initialize ( ):

SELECT MediaObject.Play(interval)
        WHERE (NAME=:SEARCHNAME);

The SELECT statement requests streaming of the media data referenced in the MediaObj object over a specified interval. If the interval parameter is 0 or left out, the play request is for all of the indicated media data.

MediaObj->Close( ) closes the cursor and closes the SQL connection between SAP 155 and DBMS 100. The following SQL statements are generated by a call to one implementation of MediaObj->Close ( ):

CLOSE ObjectCursor;
    COMMIT RELEASE;

The CLOSE statement closes the cursor. The COMMIT statement closes the connection between SAP 155 and DBMS 100.

Figure 2:
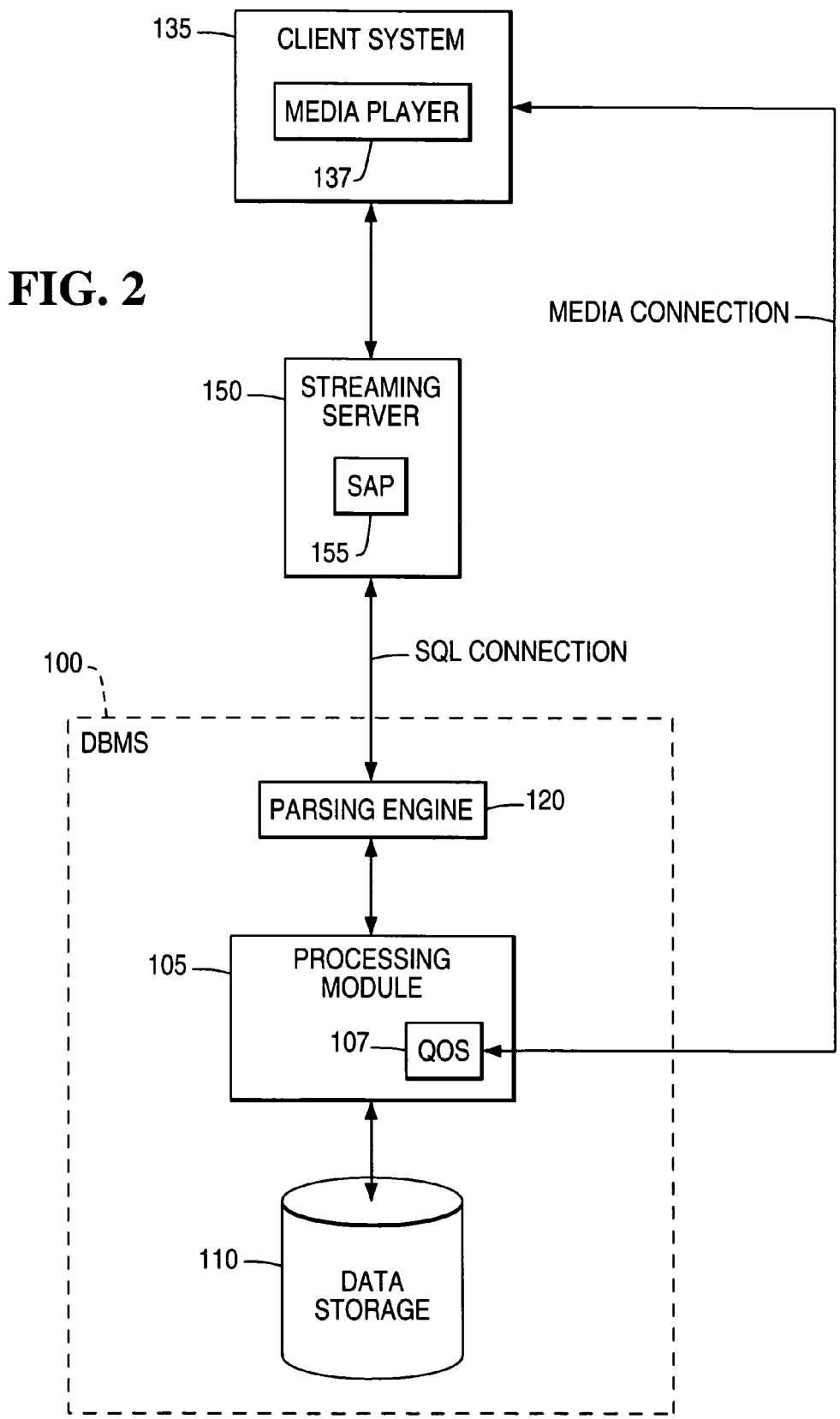
FIG. 2 represents the flow of requests and data among components shown in FIG. 1 for streaming media data to a client system.
Figure 3:
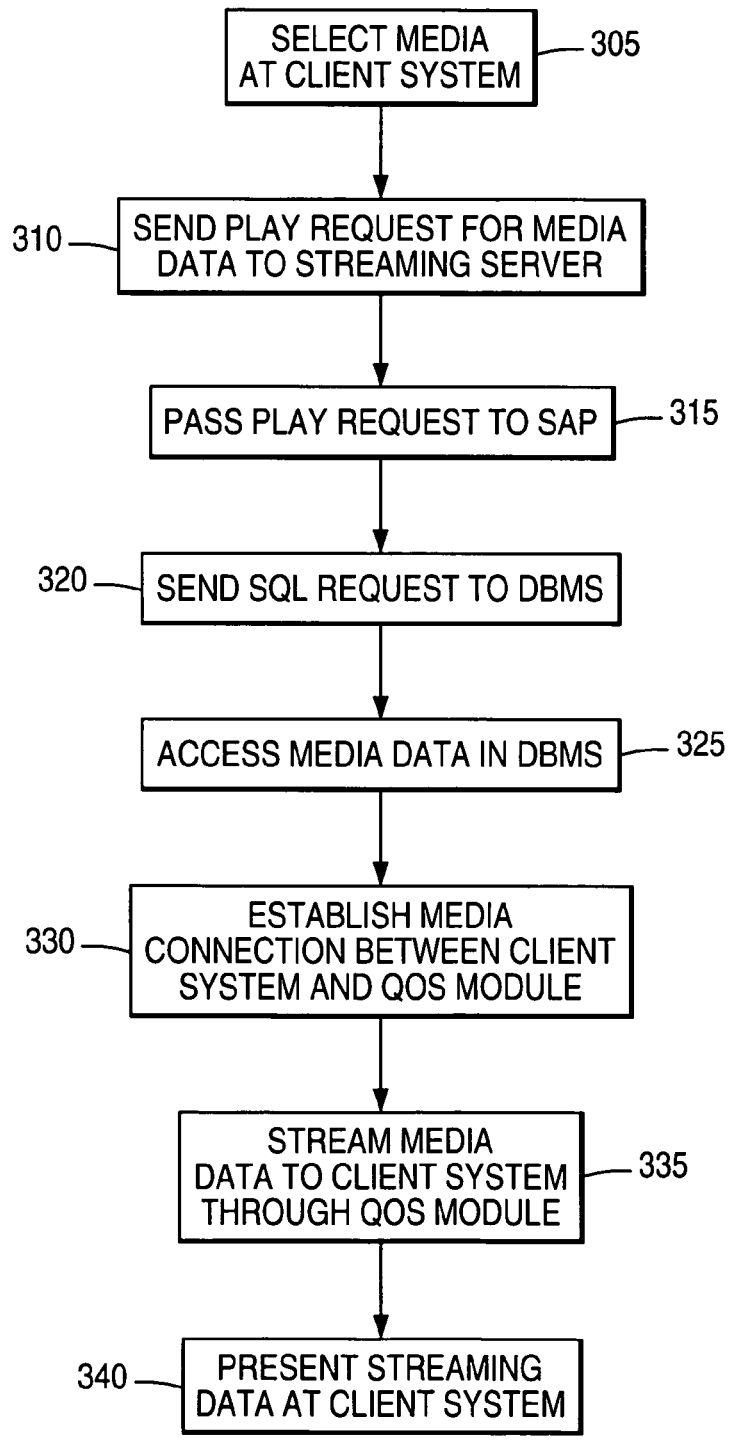
FIG. 3 is a flowchart of requesting and streaming media data to a client system.

FIG. 2 represents the flow of requests and data among components shown in FIG. 1 for streaming media data to a client system. FIG. 3 is a flowchart of requesting and streaming media data to a client system. The flowchart of FIG. 3 will be described referring to FIGS. 1 and 2.

A user at client system 135 selects media to play, block 305. The user selects the media through a media player application 137, such as a web browser. The web browser uses a media player plug-in or separate application to play the media data when it is received. Media player application 137 generates a play request indicating the selected media and client system 135 sends the play request to streaming server 150, block 310. Streaming server 150 passes the play request to SAP 155, block 315. SAP 155 opens an SQL connection to DBMS 100 across network 140 and sends a series of SQL requests indicating the selected media to DBMS 100 across the SQL connection, block 320. SAP 155 uses embedded SQL code to generate the SQL requests. DBMS 100 receives the SQL requests and accesses the indicated media data, block 325. DBMS 100 checks whether sufficient bandwidth is available for providing the minimum level of desired quality of service. If the quality of service is acceptable, DBMS 100 proceeds with the play request. If not, the play request is denied or deferred. The media data is stored in a MediaUDT object in a data storage facility 110. As described below referring to FIGS. 4 through 6, parsing engine 120 parses the SQL requests and causes the processing module 105 corresponding to the data storage facility 110 storing the indicated media data to access the media data. Parsing engine 120 returns information about the media data and connection information to SAP 155 and SAP 155 passes the information to client system 135. The connection information indicates a media socket opened by the QOS module 107 accessible through network 140. Client system 135 establishes a media connection with the QOS module 107, block 330. Client system 135 uses the connection information to establish the media connection to DBMS 100 and QOS module 107. The media connection does not pass through streaming server 150. In addition, the media connection uses network bus 145 to provide communication between the QOS module 107 and client system 135. Accordingly, the media connection does not pass through database bus 125 or parsing engine 120. The QOS module 107 streams the media data to client system 135 across the media connection, block 335. As described below referring to FIG. 7, SAP 155 sends a play request to DBMS 100 and the QOS module streams the data to client system across the media connection. Because the data is streamed across the media connection by the QOS module 107, parsing engine 120 and database bus 125 are free to continue other activity, such as database queries or establish additional streaming sessions. At client system 135, media player 137 presents the streaming data to the user according to the type information received from SAP 155, block 340.

Figure 4:
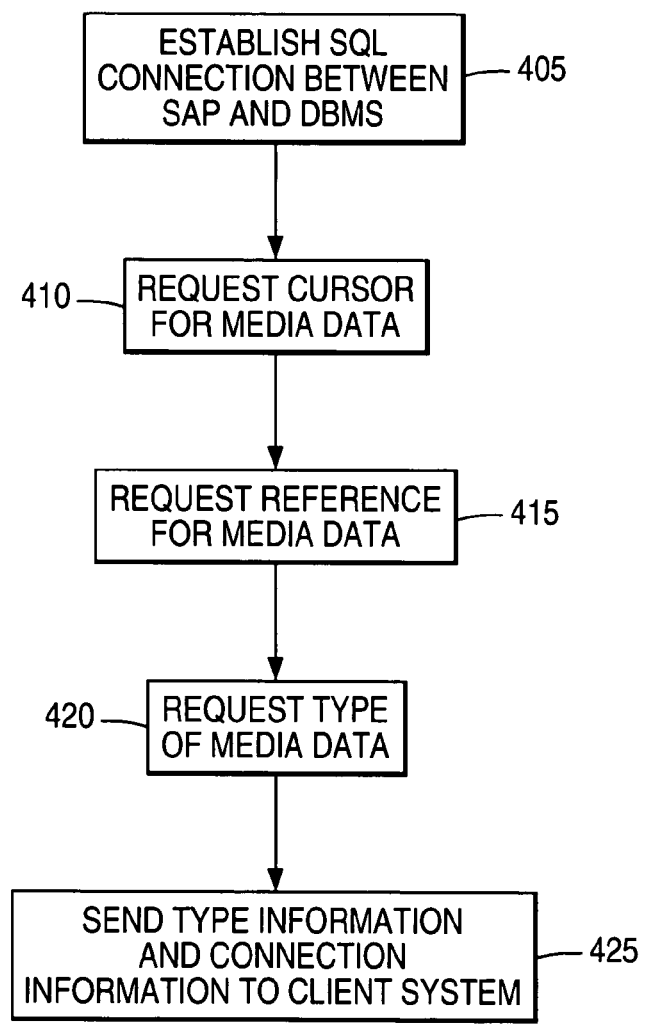
FIG. 4 is a flowchart of interaction between a Streaming Application Plug-in (SAP) and the DBMS in requesting media data be streamed.

FIG. 4 is a flowchart of interaction between SAP 155 and DBMS 100 in requesting media data be streamed. FIG. 4 expands upon blocks 320 and 325 in FIG. 3. After receiving the play request from client system 135 (recall block 315 in FIG. 3), SAP 155 establishes an SQL connection between SAP 155 in streaming server 150 and DBMS 100, block 405. SAP 155 calls the method System->Initialize( ) to establish the SQL connection. Parsing engine 120 handles SQL statements supplied to DBMS 100 by SAP 155. SAP 155 requests a cursor for the media data to be streamed, block 410. The method System->Initialize( ) defines a cursor and requests the cursor from DBMS 100. Parsing engine 120 locates the indicated media data in one of storage facilities $110_{1 \ldots N}$ and requests the corresponding processing module 105 to open a cursor. The processing module 105 assigns a processing module task to opening a cursor and the processing module task opens a cursor for the indicated media data in a table in the corresponding data storage facility 110. As described above, the cursor locks the media data so that the media data will not be changed while the cursor is open but the cursor does not lock the rest of the data for the table. The processing module task returns the cursor information to SAP 155 through parsing engine 120. After opening the cursor, SAP 155 requests a reference to the media data to be streamed, block 415. SAP 155 calls the method System->CreateObjectRef( ) to request the reference and stores the reference in a MediaObj object. As described below referring to FIG. 5, the processing module task returns the reference and a QOS module task prepares a media socket to stream data to client system 135. SAP 155 uses the received reference to confirm the media data and request the type of the media data, block 420. SAP 155 calls the method MediaObj->DoesExist( ) to confirm the existence of the media object indicated by the reference. The method MediaObj->DoesExist( ) sends a confirmation request to DBMS 100. Parsing engine 120 passes the confirmation request to the assigned processing module task. The processing module task queries the media object and returns a confirmation if the media object exists. If the media object exists, SAP 155 calls the method MediaObj->MimeType( ) to request the type of the media data stored in the media object. As described below referring to FIG. 6, in response to the type request, the processing module task returns the media type and connection information to SAP 155 through parsing engine 120. SAP 155 sends the media type information and the media connection information to client system 135, block 425. Client system 135 uses the connection information to establish a media connection to DBMS 100 and a QOS module 107 and uses the media type information to properly present the streaming media data in media player 137 (recall block 340 in FIG. 3).

Figure 5:
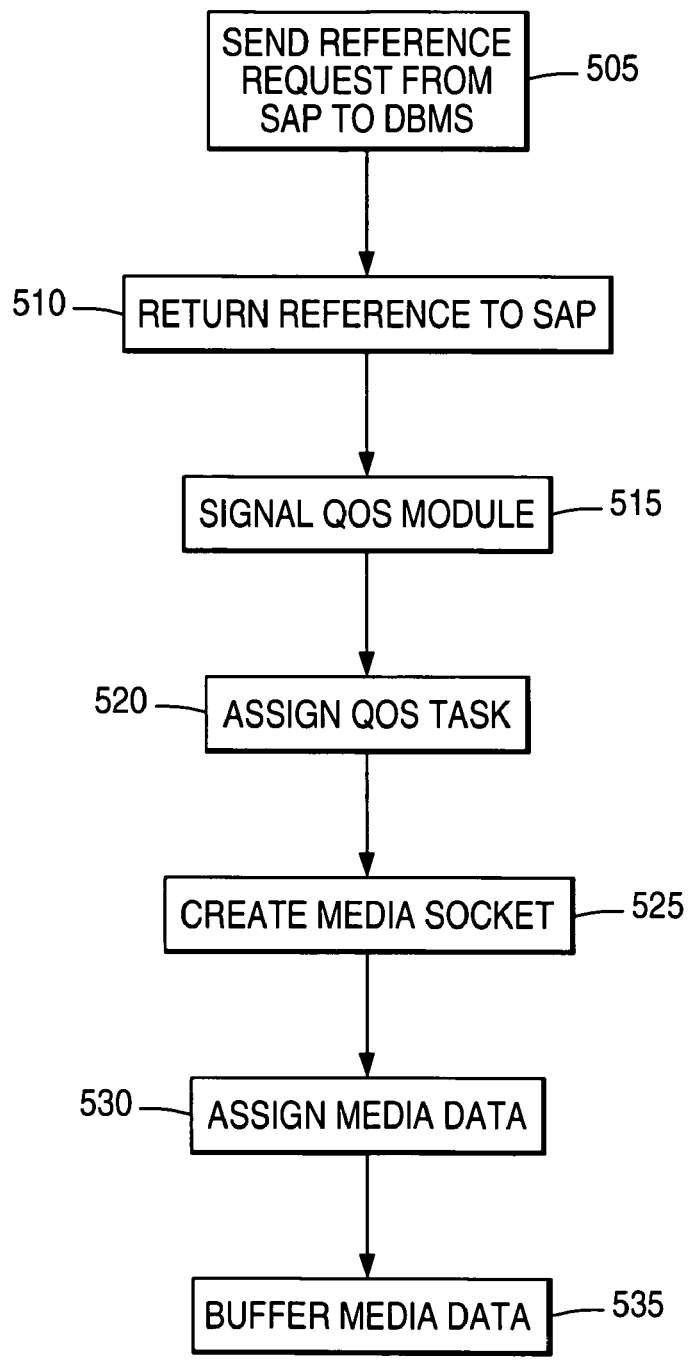
FIG. 5 is a flowchart of requesting a reference to a media data object.

FIG. 5 is a flowchart of requesting a reference to a media data object. FIG. 5 expands upon block 415 of FIG. 4. After opening the cursor for the media data (recall block 410 in FIG. 4), SAP 155 sends a request for a reference to the media data to be streamed to DBMS 100, block 505. SAP 155 calls the method System->CreateObjectRef( ) to generate the reference request. The method System->CreateObjectRef( ) generates a FETCH SQL statement based on the open cursor and sends the FETCH statement to DBMS 100. Parsing engine 120 passes the request to the assigned processing module task. The processing module task retrieves a reference to the media data object and returns the reference to SAP 155 through parsing engine 120, block 510. The processing module task signals the QOS module 107 in the processing module task's processing module 105 that a media data reference has been requested and returned, block 515. The QOS module 107 assigns a QOS module task to preparing a media socket for streaming, block 520. A QOS module task has access to local data on the data storage facility 110 and runs at a higher level of priority (e.g., higher than a typical processing module task) to ensure quality of service does not degrade below a desired level. In addition, scheduling for QOS module tasks is coordinated with other scheduling throughout DBMS 100 to avoid undesirably degrading other database services. The QOS module task creates a media socket, block 525. The media socket is available as a connection through network bus 145 to network 140 and will be used by client system 135 to establish a media connection (recall block 330 in FIG. 3). The QOS module task accesses the media data object storing the media data to be streamed, block 530. If the media data is split across multiple data storage facilities $101_{1 \ldots N}$, the QOS module task requests the media data be temporarily locked and stored in the local data storage facility 110. The QOS module task accesses the media data object through the processing module 105 (e.g., using the input/output routines of the processing module 105). Alternatively, the QOS module task accesses the media data object in the associated data storage facility 110 directly. The QOS module task buffers an initial portion of the media data to be ready to be streamed, block 535.

Figure 6:
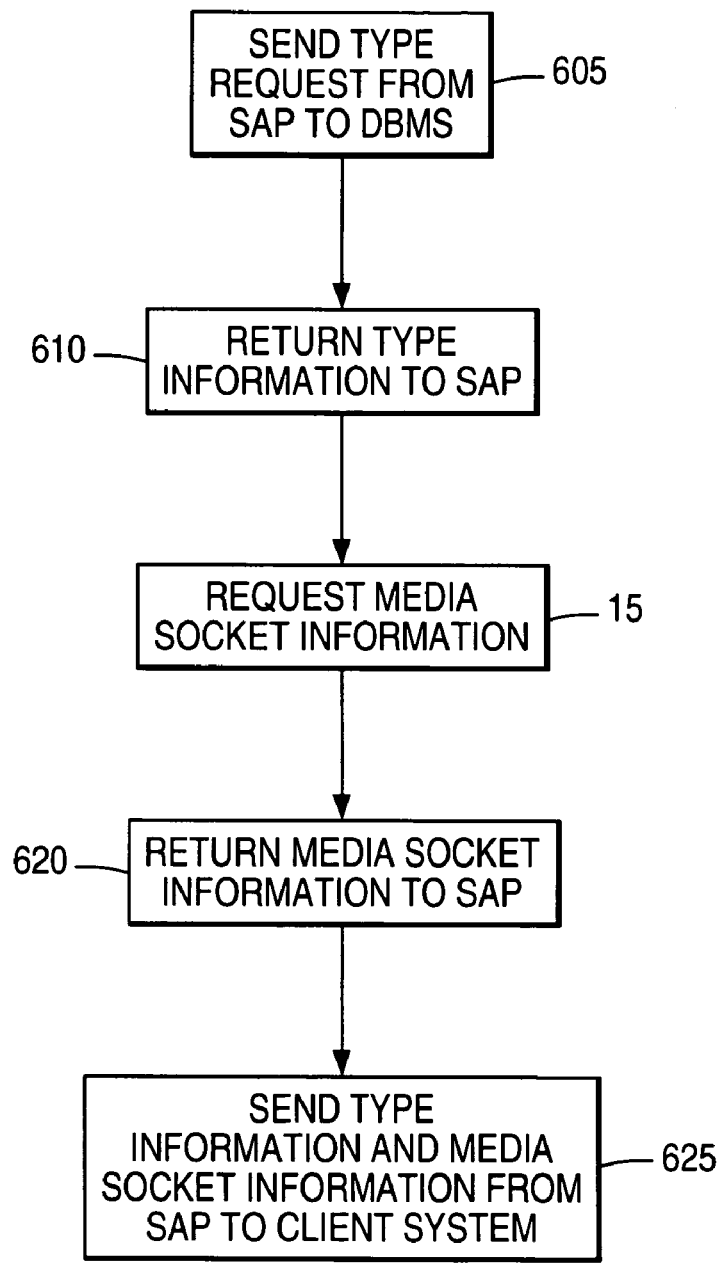
FIG. 6 is a flowchart of requesting the type of a media data object.

FIG. 6 is a flowchart of requesting the type of a media data object. FIG. 6 expands upon blocks 420 and 425 in FIG. 4. After SAP 155 receives the reference to the media data (recall block 415 in FIG. 4) and confirms that the media object exists, SAP 155 sends a request for the type of the media data indicated by the reference to DBMS 100, block 605. SAP 155 calls the method MediaObj->MimeType( ) to request the type of the media data stored in the media object. The method MediaObj->MimeType( ) sends a type request to DBMS 100. Parsing engine 120 passes the type request to the assigned processing module task. The processing module task calls the media object method MediaFormat( ). The method MediaFormat( ) accesses the media data member and reads the MIME description indicating the media type. The method MediaFormat( ) returns the MIME description and the processing module task sends the MIME description to SAP 155 through parsing engine 120, block 610. In an alternative implementation where the media type is not indicated by a MIME description, the method MediaFormat( ) returns the type information in the appropriate format and the processing module sends this type information to SAP 155. The processing module task queries the QOS module task for media socket information, block 615. The media socket information indicates the media socket established by the QOS module task (recall block 525 in FIG. 5). The QOS module task returns the media socket information to the processing module task. The processing module task sends the media socket information to SAP 155 through parsing engine 120, block 620. SAP 155 sends the media type information and the media socket information to client system 135, block 625. The MimeType( ) method can pass on the returned media type data without modification or can generate a MIME tag to send to client system 135. In an alternative implementation, SAP 155 determines the media type locally (i.e., without sending a media type request to DBMS 100) by assessing data received from DBMS 100 in response to the reference request (recall block 415 in FIG. 4).

Figure 7:
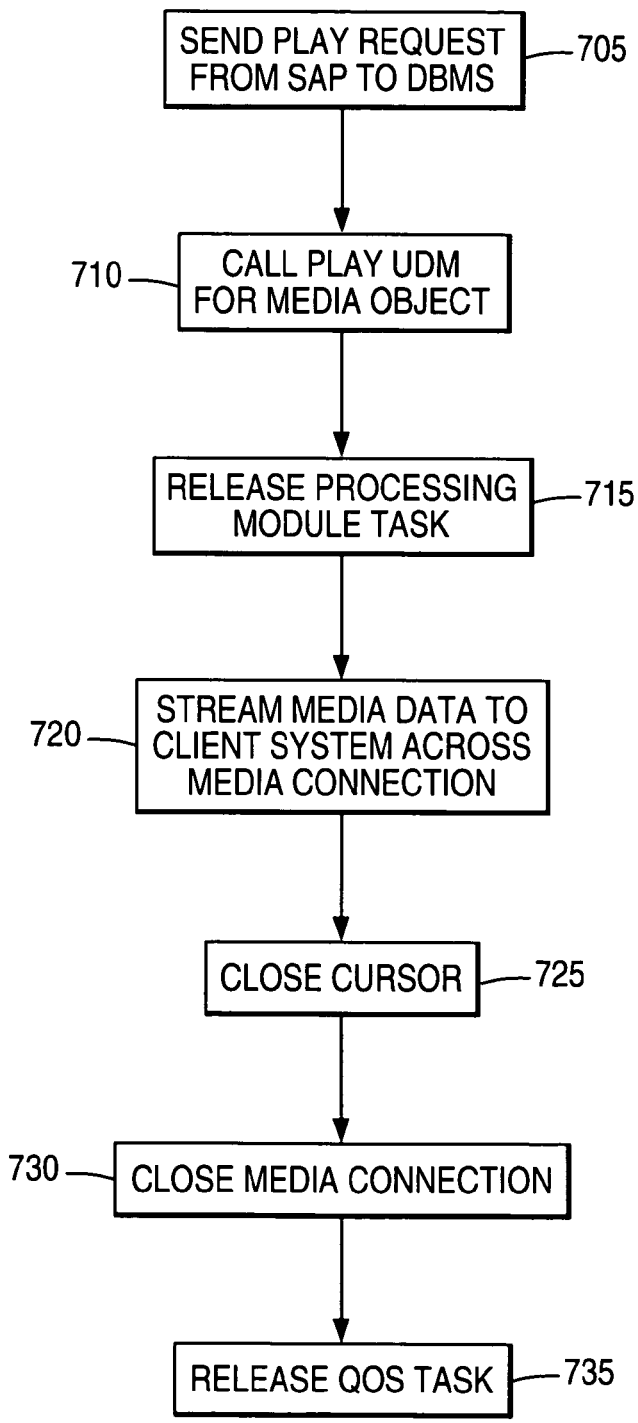
FIG. 7 is a flowchart of streaming media data to a client system.

FIG. 7 is a flowchart of streaming media data to a client system. FIG. 7 expands upon block 335 in FIG. 3. After the media connection has been established between client system 135 and DBMS 100 (recall block 330 in FIG. 3), SAP 155 sends a play request to DBMS 100, block 705. SAP 155 calls the method MediaObj->Initialize( ) to send the play request. The method MediaObj->Initialize( ) sends a play request to DBMS 100 for the referenced media object. Parsing engine 120 passes the play request to the assigned processing module task. The processing module task calls the method Play( ) for the media object, block 710. The method Play( ) is handled by the QOS module task. The processing module 105 releases the assigned processing module task, block 715. Alternatively, SAP 155 sends the play request after sending the type information and media connection information to client system 135 and the processing module task is released after the media connection has been established. The released processing module task is now free to handle other session requests, such as establishing additional streaming sessions. The method Play( ) causes the QOS module task to stream the media data from the media object across the media connection to client system 135, block 720. The QOS module begins streaming with the previously buffered media data (recall block 535 in FIG. 5).

When the QOS module task reaches the end of the media data, the streaming is complete and the QOS module task signals SAP 155 through parsing engine 120. Alternatively, client system 135 signals SAP 155 that streaming is complete. SAP 155 closes the streaming session by calling the method MediaObj->Close( ). The method MediaObj->Close( ) closes the cursor, block 725. SAP 155 sends the request to close the cursor to DBMS 100. Parsing engine 120 passes the close request to the processing module 105 and the processing module closes the cursor. The QOS module task closes the media connection, block 730. The QOS module then releases the QOS module task, block 735.

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules $105_1 \ldots _N$, QOS modules $107_1 \ldots _N$, data storage facilities $101_1 \ldots _N$, and parsing engine 120. Similarly, in one implementation, client system 135 and streaming server 150 are also programmable computers. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

The invention claimed is:

1. A method of streaming data from a database system to a client system, comprising:
   receiving a stream request at a database system from a streaming server to stream a selection of media data where at least part of the media data is stored in a media object;
   opening a cursor indicating the media object, where the cursor locks the media object and prevents the media object from being altered;
   sending a reference to the media object to the streaming server;
   sending a media type of the media data stored in the media object to the streaming server;
   opening a media socket, where the media socket is identified by media socket information, and where the media socket is used to establish a media connection between the database system and the client system;
   sending the media socket information to the streaming server; and
   streaming the media data in the media object across the media connection to the client system using a quality of service module in the database system, where the quality of service module uses one or more dedicated quality of service module tasks to stream data.

2. A method of streaming data from a database system to a client system comprising:
   receiving a stream request at a database system from a streaming server to stream a selection of media data, where at least part of the media data is stored in a media object;
   assigning a worker task for locating and accessing the media object in response to the stream request;
   opening a cursor indicating the media object using the worker task, where the cursor locks the media object and prevents the media object from being altered;
   sending a reference to the media object to the streaming server using the worker task;
   signaling the QOS module to prepare for streaming using the worker task;
   assigning a QOS module task to prepare for streaming;
   opening a media socket using the QOS module task, where the media socket is identified by media socket information, and where the media socket is used to establish the media connection;
   buffering media data for streaming using the QOS module task;
   sending a media type of the media data stored in the media object to the streaming server using the worker task;
   requesting the media socket information from the QOS module task using the worker task;
   sending the media socket information to the streaming server using the worker task;
   receiving a play request from the streaming server;
   releasing the worker task after receiving the play request and establishing the media connection between the database system and the client system;
   streaming the media data in the media object across the media connection to the client system using a quality of service module in the database system, where the quality of service module uses one or more dedicated quality of service module tasks to stream data;
   closing the cursor after completing streaming the media data;
   closing the media connection using the QOS module task after completing streaming the media data; and
   releasing the QOS module task.

3. A method of requesting data be streamed from a database system to a client system, comprising:
   receiving a client stream request at a streaming server from a client system to stream a selection of media data, where at least part of the media data is stored in a media object in a database system;
   passing the client stream request to a streaming application plug-in;
   generating a streaming server stream request based on the client stream request within the streaming application plug-in;
   sending the streaming server stream request to the database system;
   receiving a media type of the media data stored in the media object from the database system;
   receiving media socket information from the database system, where the media socket information identifies the media socket and the media socket is used to establish a media connection between the client system and the database system;
   sending the media type and the media socket information to the client system;
   sending an open cursor request to the database system for a cursor indicating the media object;

sending a reference request to the database system for a reference to the media object;
receiving the reference to the media object from the database system;
sending a type request for the media to the database system; and
sending a close cursor request to the database system to close the open cursor; where the open cursor request, the reference request, the type request, and the close cursor request are generated by the streaming application plug-in based on the client stream request.

4. The method of claim 3, where the open cursor request, the reference request, the type request, and the close cursor request each include one or more SQL statements.

5. A computer program stored on a tangible storage medium, for use in streaming data from a database system to a client system, the program comprising executable instructions that cause a computer to:
receive a stream request at a database system from a streaming server to stream a selection of media data, where at least part of the media data is stored in a media object;
open a cursor indicating the media object, where the cursor locks the media object and prevents the media object from being altered;
send a reference to the media object to the streaming server;
send a media type of the media data stored in the media object to the streaming server;
open a media socket, where the media socket is identified by media socket information;
send the media socket information to the streaming server;
establish the media connection between the database system and the client system using the media socket; and
stream the media data in the media object across the media connection to the client system using a quality of service module in the database system, where the quality of service module uses one or more dedicated quality of service module tasks to stream data.

6. A computer program, stored on a tangible storage medium, for use in streaming data from a database system to a client system, the program comprising executable instructions that cause a computer to:
receive a stream request at a database system from a streaming server to stream a selection of media data, where at least part of the media data is stored in a media object;
assign a worker task for locating and accessing the media object in response to the stream request;
open a cursor indicating the media object using the worker task, where the cursor locks the media object and prevents the media object from being altered;
send a reference to the media object to the streaming server using the worker task;
signal the QOS module to prepare for streaming using the worker task;
assign a QOS module task in the database system to prepare for streaming;
open a media socket using the QOS module task, where the media socket is identified by media socket information;
establish a media connection between the database system and the client system using the media socket;
buffer media data for streaming using the QOS module task;
send a media type of the media data stored in the media object to the streaming server using the worker task;
request the media socket information from the QOS module task using the worker task;
send the media socket information to the streaming server using the worker task;
receive a play request from the streaming server;
release the worker task after receiving the play request and establishing the media connection;
stream the media data in the media object across the media connection to the client system using the OS module task;
close the cursor after completing streaming the media data;
close the media connection using the QOS module task after completing streaming the media data; and
release the QOS module task.

7. A computer program, stored on a tangible storage medium, for use in requesting data be streamed from a database system to a client system, the program comprising executable instructions that cause a computer to:
receive a client stream request at a streaming server from a client system to stream a selection of media data, where at least part of the media data is stored in a media object in a database system;
pass the client stream request to a streaming application plug-in;
generate a streaming server stream request based on the client stream request within the streaming application plug-in;
send the streaming server stream request to the database system;
send an open cursor request to the database system for a cursor indicating the media object;
send a reference request to the database system for a reference to the media object;
receive the reference to the media object from the database system;
send a media type request for the media data stored in the media object to the database system;
receive the media type of the media data stored in the media object from the database system;
receive media socket information from the database system where the media socket information identifies the media socket and the media socket is used to establish a media connection between the client system and the database system;
send the media type and the media socket information to the client system; and
send a close cursor request to the database system to close the open cursor; where the open cursor request, the reference request, the type request, and the close cursor request are generated by the streaming application plug-in based on the client stream request.

8. The computer program of claim 7, where the open cursor request, the reference request, the type request, and the close cursor request each include one or more SQL statements.

* * * * *

UNITED STATES PATENT AND TRADEMARK OFFICE
CERTIFICATE OF CORRECTION

| | | |
|---|---|---|
| PATENT NO. | : 7,035,874 B1 | Page 1 of 1 |
| APPLICATION NO. | : 10/112335 | |
| DATED | : April 25, 2006 | |
| INVENTOR(S) | : M. Reed, D. Frazier and K. Gold | |

It is certified that error appears in the above-identified patent and that said Letters Patent is hereby corrected as shown below:

Col. 12, Line 13, after "the", second occurence delete, "OS" and insert --QOS--

Signed and Sealed this

Third Day of April, 2007

JON W. DUDAS
*Director of the United States Patent and Trademark Office*